United States Patent
Kokusho et al.

(10) Patent No.: US 8,667,137 B2
(45) Date of Patent: Mar. 4, 2014

(54) METHOD AND APPARATUS FOR RESOURCE-ALLOCATION MANAGEMENT

(75) Inventors: Yasuhiro Kokusho, Kunitachi (JP); Satoshi Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 12/729,404

(22) Filed: Mar. 23, 2010

(65) Prior Publication Data

US 2010/0223386 A1  Sep. 2, 2010

Related U.S. Application Data

(63) Continuation of application No. PCT/JP2007/068688, filed on Sep. 26, 2007.

(51) Int. Cl.
*G06F 15/173* (2006.01)

(52) U.S. Cl.
USPC .......................................... 709/226

(58) Field of Classification Search
USPC .......................................... 709/226
See application file for complete search history.

(56) References Cited

U.S. PATENT DOCUMENTS

| | | | |
|---|---|---|---|
| 6,321,207 B1 | 11/2001 | Ye | |
| 2003/0187746 A1* | 10/2003 | Kochanski | 705/26 |
| 2004/0010592 A1* | 1/2004 | Carver et al. | 709/226 |
| 2005/0065844 A1* | 3/2005 | Raj et al. | 705/14 |
| 2011/0231551 A1* | 9/2011 | Hassan et al. | 709/226 |
| 2012/0254420 A1* | 10/2012 | Hassan et al. | 709/224 |

FOREIGN PATENT DOCUMENTS

| | | |
|---|---|---|
| JP | 11-312205 | 11/1999 |
| JP | 2001-290967 | 10/2001 |
| JP | 2002-542544 | 12/2002 |
| JP | 2004-062387 | 2/2004 |

OTHER PUBLICATIONS

Kevin Lai et al.; "Tycoon: A Distributed Market-based Resource Allocation System;" [online] HP Laboratories; URL:http://arxiv.org/abs/cs.DC/0404013; retrieved Aug. 2, 2007.

Carl A. Waldspurger et al.; "Spawn: A Distributed Computational Economy;" [online] URL:http://citeseer.ist.psu.edu/512006.html; retrieved Aug. 2, 2007.

C. Boutilier et al.; "Resource Allocation Using Sequential Auctions;" Germany, Lecture Notes in Computer Science, 2000, vol. 1788, p. 131-152.

Hattori et al.; "Determining Bidding Strategies in Sequential Auctions: Quasi-Linear Utility and Budget Constraints;" The Institute of Electronics, Information and Communication Engineers; Oct. 1, 2002; No. 10, p. 974-984.

Takahashi et al.; "User's Behaviour and efficiency in Bid-based Bandwidth Allocation Method;" the Institute of Electronics, Information and Communication Engineers; Dec. 6, 2002; vol. 101, No. 429, p. 73-79.

* cited by examiner

*Primary Examiner* — Brian P Whipple
(74) *Attorney, Agent, or Firm* — Greer Burns & Crain Ltd.

(57) ABSTRACT

A resource-allocation management method includes generating budget-allocation-plan information indicating how a budget used by each client for auction is allocated to each interval on the basis of demand-estimation information indicating an estimation value of the amount of resources each client needs for each interval and of budget-estimation information indicating an estimation value of a budget each client uses in an auction, and determining the upper limit of a budget each client uses in the auction on the basis of the budget-allocation-plan information.

18 Claims, 16 Drawing Sheets

| CLIENT ID | INTERVAL | NECESSARY AMOUNT OF RESOURCE |
|---|---|---|
| CLIENT A | 2007/4/1 | 4 |
|  | 2007/4/2 | 5 |
|  | 2007/4/3 | 4 |
|  | ... | ... |
| CLIENT B | 2007/4/1 | 8 |
|  | 2007/4/2 | 7 |
|  | 2007/4/3 | 10 |
|  | ... | ... |
| ... | ... | ... |

| CLIENT ID | INTERVAL | ADDITIONAL BUDGET |
|---|---|---|
| CLIENT A | 2007/4/1 | 60000 |
|  | 2007/4/2 | 60000 |
|  | 2007/4/3 | 60000 |
|  | ... | ... |
| CLIENT B | 2007/4/1 | 150000 |
|  | 2007/4/2 | 180000 |
|  | 2007/4/3 | 170000 |
|  | ... | ... |
| ... | ... | ... |

| CLIENT ID | INTERVAL | BUDGET-CONSUMPTION RATE |
|---|---|---|
| CLIENT A | 2007/4/1 | 80% |
| | 2007/4/2 | 82% |
| | 2007/4/3 | 80% |
| | ... | ... |
| | 2007/12/1 | 120% |
| | ... | ... |
| CLIENT B | 2007/4/1 | 65% |
| | 2007/4/2 | 57% |
| | 2007/4/3 | 62% |
| | ... | ... |
| | 2007/4/30 | 130% |
| | ... | ... |
| ... | ... | ... |

| CLIENT ID | SECTION | VALUE |
|---|---|---|
| CLIENT A | SELECTED POLICY | PRIORITY-PERIOD SPECIFIED TYPE |
| | PERIOD: 10/1 TO 11/30 | 100% |
| | PERIOD: 12/1 TO 1/10 | 120% |
| | PERIOD: OTHERS | 80% |
| ... | ... | ... |

| CLIENT ID | ADDITIONAL BUDGET | CARRY-OVER BUDGET |
|---|---|---|
| CLIENT A | 60000 | 80000 |
| CLIENT B | 160000 | 340000 |
| ... | ... | ... |

| PGID | HOST |
|---|---|
| PG01 | serv01, serv02 |
| PG02 | serv03 |
| PG03 | serv04, serv05, serv06 |
| ... | ... |

| INTERVAL | PGID | CLIENT ID | SUCCESSFUL BID PRICE |
|---|---|---|---|
| 2007/4/1 | PG01 | CLIENT A | 20000 |
| | PG02 | CLIENT B | 40000 |
| | ... | ... | ... |
| 2007/4/2 | PG01 | CLIENT B | 30000 |
| | PG02 | CLIENT D | 30000 |
| | ... | ... | ... |
| ... | ... | ... | ... |

| CLIENT ID | INTERVAL | ADDITIONAL BUDGET |
|---|---|---|
| CLIENT A | 2007/4/1 TO 2007/4/30 | 1800000 |
| | 2007/5/1 TO 2007/5/31 | 1900000 |
| | 2007/6/1 TO 2007/6/30 | 1700000 |
| | ... | ... |
| CLIENT B | 2007/4/1 | 160000 |
| | 2007/4/2 | 150000 |
| | 2007/4/3 | 200000 |
| | ... | ... |
| ... | ... | ... |

POLICY SETTING ☒

CLIENT: XXX
ADDITIONAL BUDGET: 0.3 MILLION YEN,
CARRY-OVER BUDGET: 0.24 MILLION YEN
(2007/7/18)

SELECTED POLICY:

◎ SIMPLE TYPE
● PRIORITY-PERIOD SPECIFIED TYPE

PARAMETER SETTING FOR
PRIORITY-PERIOD SPECIFIED TYPE:

| PERIOD | BUDGET-CONSUMPTION RATE |
|---|---|
| 10/1 TO 11/30 | 100% |
| 12/1 TO 1/10 | 120% |
| - | - |
| OTHERS | 80% |

[ ADD LINE... ]  [ REMOVE LINE... ]

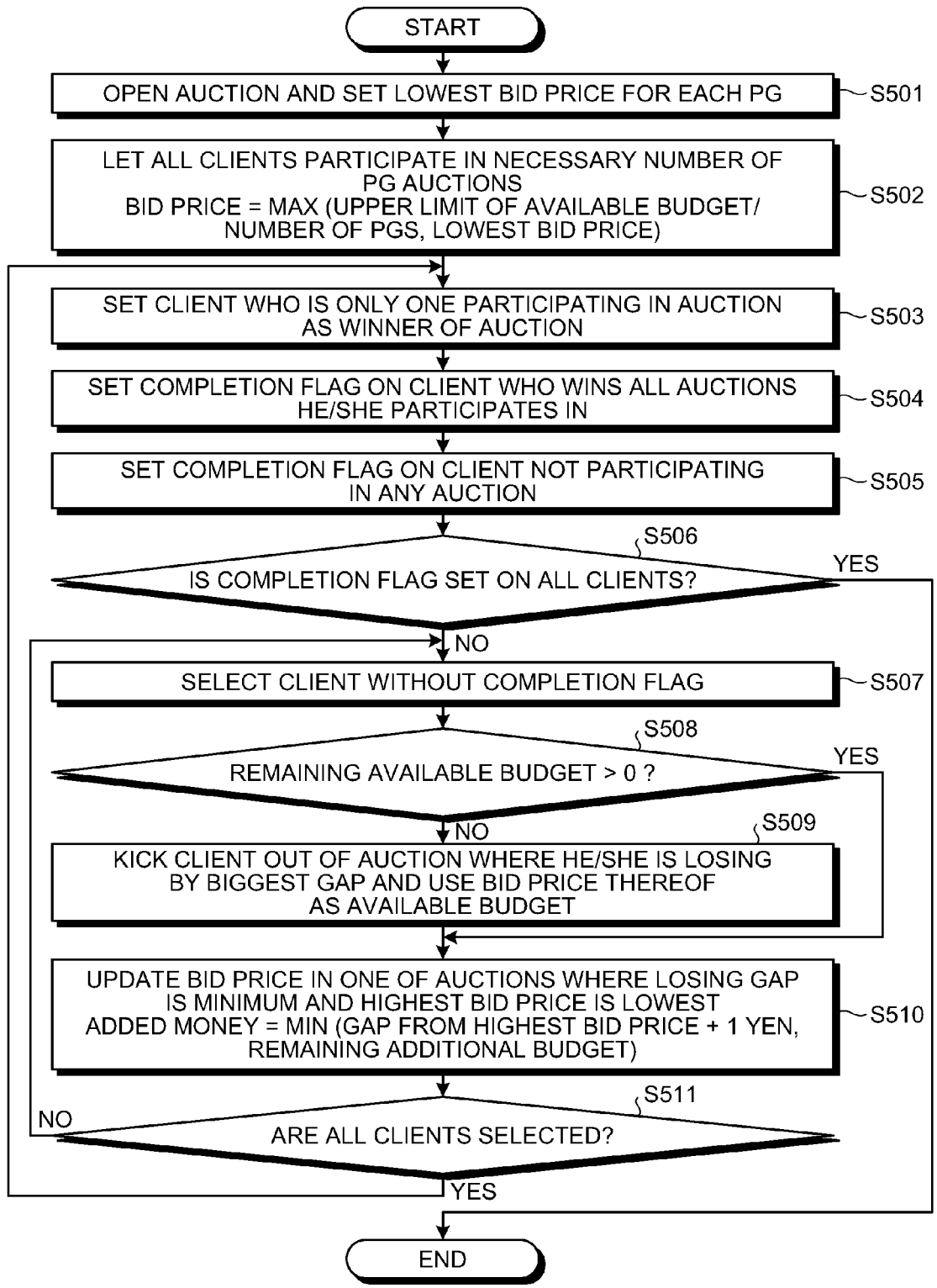

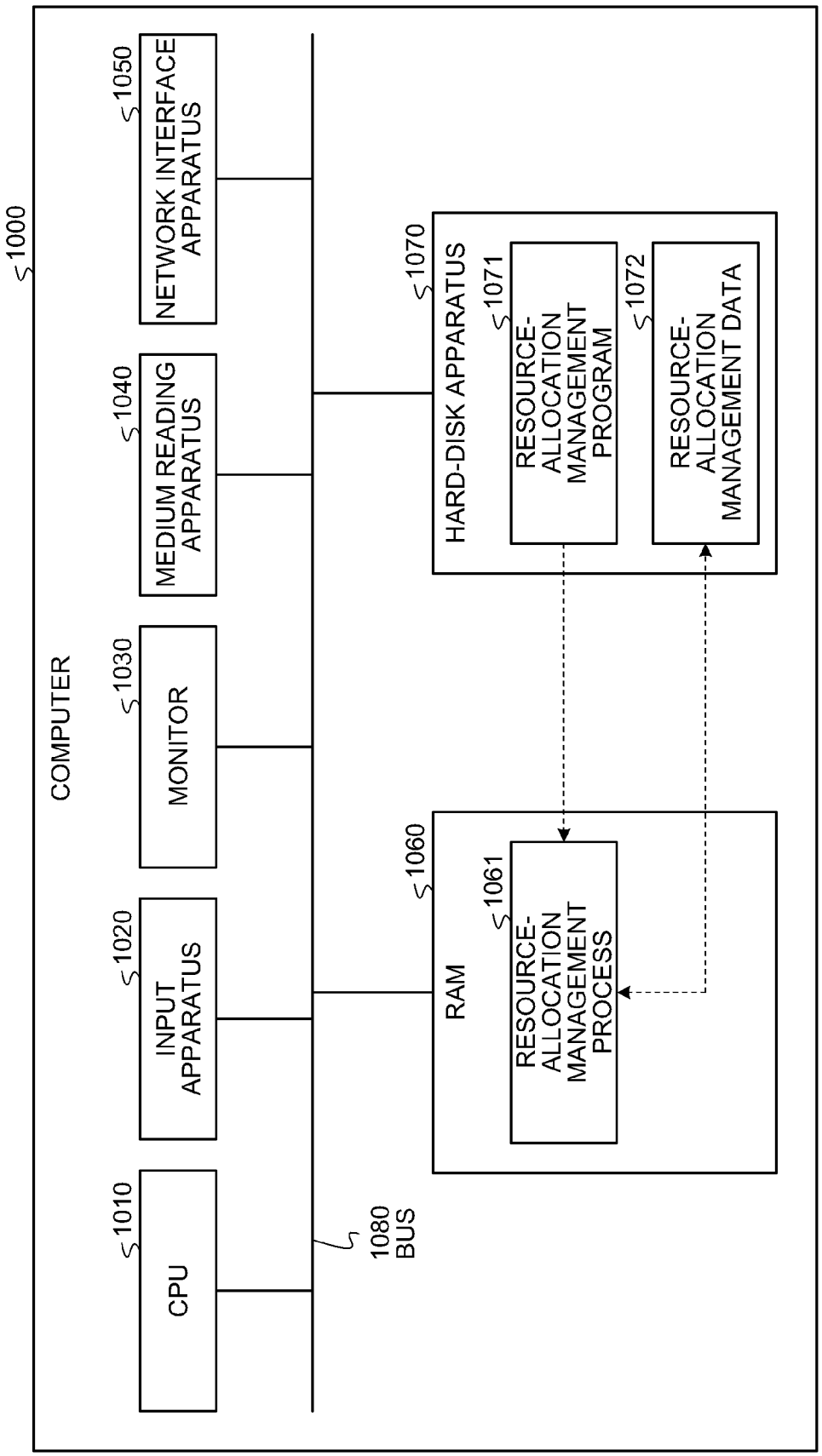

METHOD AND APPARATUS FOR RESOURCE-ALLOCATION MANAGEMENT

CROSS-REFERENCE TO RELATED APPLICATION(S)

This application is a continuation of International Application No. PCT/JP2007/068688, filed on Sep. 26, 2007, the entire contents of which are incorporated herein by reference.

FIELD

The embodiments discussed herein are directed to a resource-allocation management program, a resource-allocation management apparatus, and a resource-allocation management method that determine the amount of resources allocated to clients by performing auction processes on predetermined resources at predetermined intervals.

BACKGROUND

At a data center providing outsourced network services to a plurality of clients, various kinds of resources such as processing power and network bandwidth are to be used effectively, and such resources are allocated in a way that meets the demands of the clients. The amount of resources each client needs changes over time and a pattern of such changes differs depending on the clients. Therefore, the data center periodically changes the amount of resources allocated to each client.

An auction method is known as a method of periodically changing the amount of resources allocated to clients in a way that meets the demands of clients (see Kevin Lai, Bernardo A. Huberman, Leslie Fine, "Tycoon: A Distributed Market-based Resource Allocation System", [online], HP Laboratories, 2004, retrieved on 2007 Aug. 2 from the Internet, and Carl A. Waldspurger, Tod Hogg, Bernardo A. Huberman, Jeffrey O. Kephart, Scott Stornetta, "Spawn: A Distributed Computational Economy", [online], 1991, retrieved on 2007 Aug. 2 from the Internet. With the auction method, an auction is held at predetermined intervals for a transaction unit, which is a certain segmented amount of resources, and, at each interval, a transaction unit is allocated to a client who offers the highest bid price for the transaction unit. In such an auction method, a client offers a bid price corresponding to the demand from the client himself/herself for each transaction unit, and, as a result, various kinds of resources can be properly allocated in a way that meets the demands of the clients.

For example, there are a client A, who needs a large amount of resource at the beginning of a month, and a client B, who needs a large amount of resource at the end of a month. In this case, the client A is expected to put a large portion of his/her budget to auctions at the beginning of a month so that he/she can make successful bids and win a sufficient amount of resource at the beginning of the month, whereas the client B is expected to allocate a large amount of his/her budget on auctions at the end of a month so that he/she can make successful bids and win a sufficient amount of resource at the end of the month. As such, with the auction method of allocating resources, clients adjust their budget distribution in a way that meets the pattern of their demands so that the resources can be properly allocated in a way that meets the demands of the clients.

However, when resources are allocated with the conventional auction method, clients may not obtain a sufficient amount of resources they need because of their poor strategies. For example, a client who needs a large amount of resources at the end of a month may use up a large portion of his/her budget at the beginning of a month to win a competition against other clients, and he/she may not be able to obtain a sufficient amount of resources at the end of the month, when a large amount of resources is needed, because of the shortage of money.

SUMMARY

According to an aspect of the invention, a resource-allocation management method includes generating budget-allocation-plan information indicating how a budget used by each client for auction is allocated to each interval on the basis of demand-estimation information indicating an estimation value of the amount of resources each client needs for each interval and of budget-estimation information indicating an estimation value of a budget each client uses in an auction, and determining the upper limit of a budget each client uses in the auction on the basis of the budget-allocation-plan information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating exemplary demand-estimation information;

FIG. 5 is a diagram illustrating exemplary budget-estimation information;

FIG. 6 is a diagram illustrating exemplary budget-allocation-plan information;

FIG. 7 is a diagram illustrating exemplary policy information;

FIG. 8 is a diagram illustrating exemplary holding-budget information;

FIG. 9 is a diagram illustrating exemplary resource information;

FIG. 10 is a diagram illustrating exemplary allocation-record information;

FIG. 11 is a diagram illustrating exemplary credit information;

FIG. 12 is a diagram illustrating an exemplary edit screen of the demand-estimation information and budget-estimation information;

FIG. 13 is a diagram illustrating an exemplary edit screen of the policy information;

FIG. 19 is a flowchart illustrating a procedure of an auction processing; and

FIG. 20 is a functional block diagram of a computer executing a resource-allocation management program.

DESCRIPTION OF EMBODIMENT(S)

Preferred embodiments of the present invention will be explained with reference to accompanying drawings. The embodiments do not limit the scope of the present invention.

Figure 1:
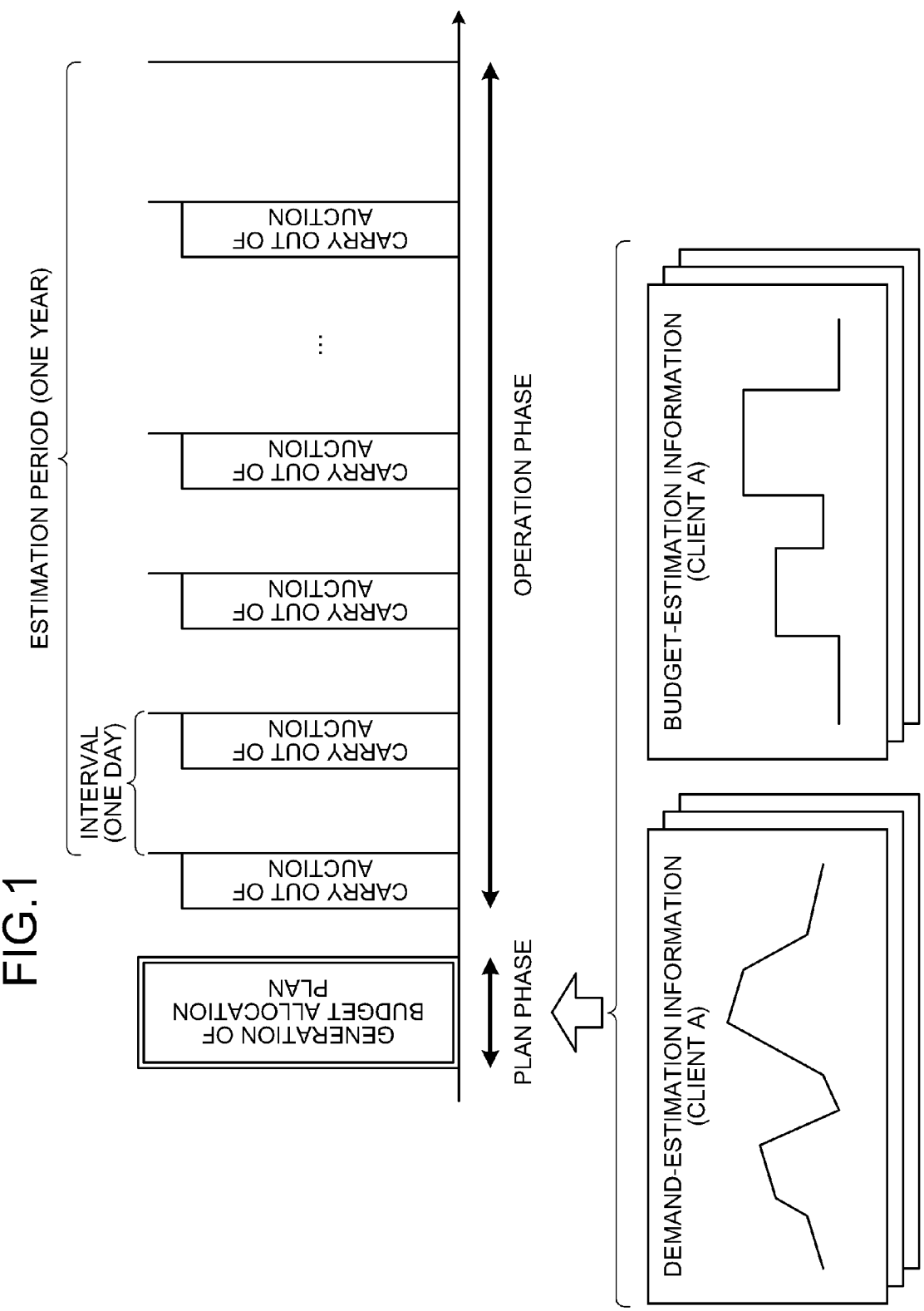
FIG. 1 is a diagram illustrating an outline of a resource allocation management method in accordance with an embodiment.

The outline of the resource-allocation management method in accordance with the present invention is described. FIG. 1 is a diagram illustrating the configuration of a resource-allocation management method in accordance with the embodiment. As illustrated in FIG. 1, with the resource-allocation management method in accordance with the embodiment, an auction is processed at each predetermined interval (e.g., one day) to determine the amount of resources allocated to clients. The resources include processors, bandwidth of a network, storage area of a storage apparatus, and the like.

Resources at a data center are previously divided into a point group (hereinafter "PG"), which is a transaction unit of a predetermined size, and an auction is processed for each PG. For example, for a processor, an auction is processed for each PG, i.e., hosts combined for providing processing power of 10 GHz or so.

Figure 2:
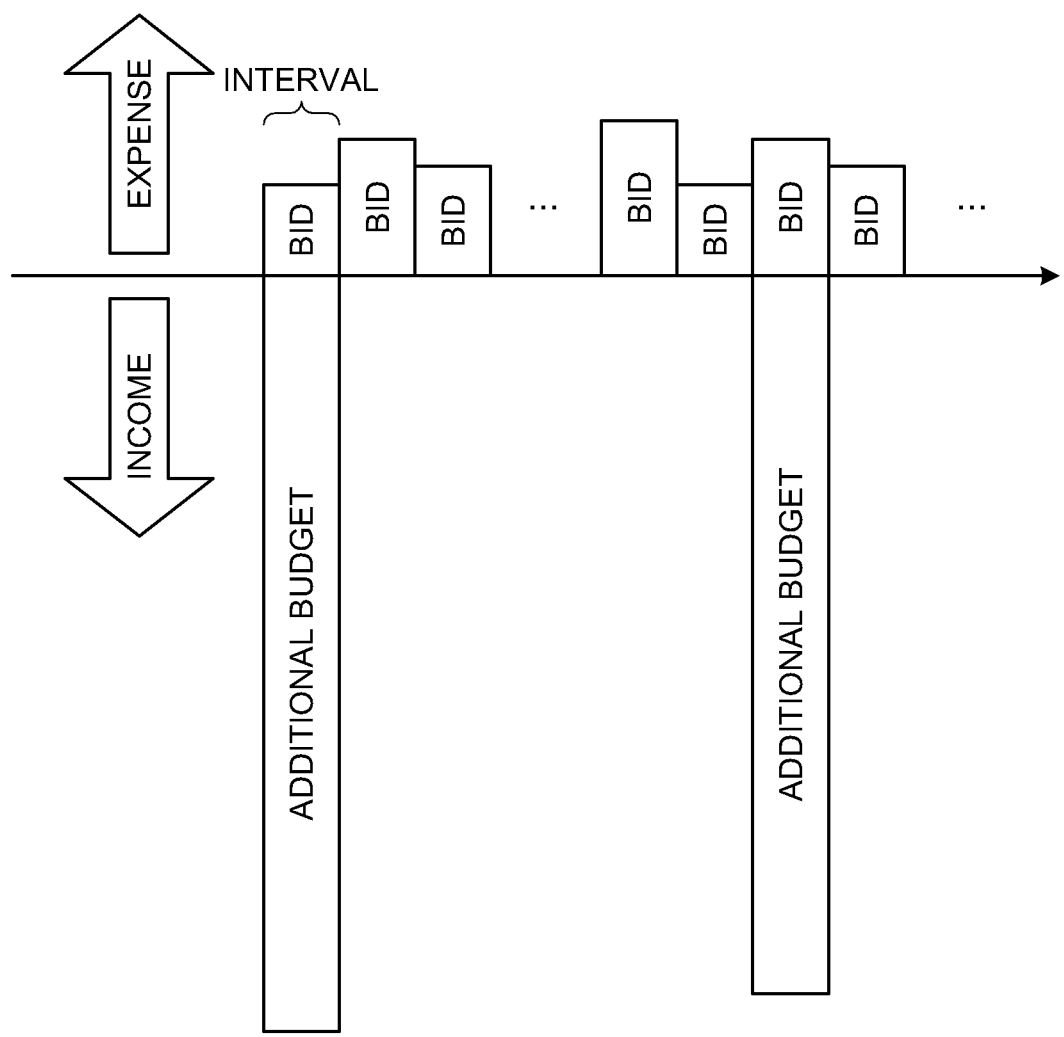
FIG. 2 is a diagram illustrating money flow at each interval.

FIG. 2 illustrates money flows at each interval. As illustrated in FIG. 2, a client obtains, at each predetermined interval, a budget that is to be used for auctions as his/her income. For example, a client, providing a network service that charges users money at the end of each month, like a membership-based service, obtains income at the end of each month while a client, providing a network service that charges users money as needed, like an online-shopping site, obtains income everyday. These clients use the obtained income and a budget that is remaining after the auctions in the past as bidding money at each interval until they obtain income next time.

In order for a client to secure the needed amount of resources in the auction at each interval, the client needs an accurate understanding of how his/her demand and a budget available for auctions will change in the future. On the basis of these pieces of information, the client needs to allocate his/her budget at each interval properly. However, even if the client accurately understands these pieces of information, the chance for the client to actually obtain the needed amount of resources changes depending on the amount of resources other clients obtain and the amount of budget other clients are going to use for auctions. Therefore, it is hard for the client to properly allocate his/her budget at each interval and obtain a sufficient amount of resources, so the client needs an effective strategy.

With the resource-allocation management method in accordance with the present embodiment, as illustrated in FIG. 1, the data center with an understanding of all clients' usage records of resources generates demand-estimation information and budget-estimation information of each client for a predetermined estimation period (e.g., one year) on the basis of usage record and the like. The demand-estimation information indicates an estimation value of the amount of resources a client needs at each interval during the estimation period. The budge-estimation information indicates an estimation value of the budget a client can use for auctions at each interval during the estimation period.

At a plan phase, which is previous to an operation phase, the data center generates budget-allocation-plan information on the basis of the demand-estimation information and the budget-estimation information. The budget-allocation-plan information is determined on the basis of relative relations between the amounts of resources respective clients need, and the budget-allocation-plan information indicates the proportion of budget each client is expected to use for an auction at each interval during the estimation period so that all clients can obtain the maximum amount of resources with the minimum budget. Calculating an upper limit of the budget each client is expected to use at each interval on the basis of the budget-allocation-plan information, the data center carries out an auction and determines the amount of resources allocated to each client.

As described, with the resource-allocation management method in accordance with the present embodiment, the data center with an understanding of all clients' usage record of resources generates the budget-allocation-plan information, and auctions are held on the basis of the budget-allocation-plan information. Therefore, even if a client is unable to allocate his/her budget following an effective strategy, he/she can secure a sufficient amount of resources with a little budget.

In the example illustrated in FIG. 1, the data center generates the budget-allocation-plan information for a single estimation period. The estimation periods are set successively so that there is no blank period. Before the operation phase corresponding to the ongoing estimation period is completed, the plan phase for the next estimation period is processed in parallel, and the budget-allocation-plan information for the next estimation period is generated on the basis of usage records of the past.

The configuration of a resource-allocation management apparatus 10 employing the resource-allocation management method in accordance with the present embodiment is described below. The resource-allocation management apparatus 10 is located at a data center or the like. The resource-allocation management apparatus 10 generates the budget-allocation-plan information, which determines the proportion of budget a client is expected to use at each interval during the estimation period, and automatically carries out the auction using the budget-allocation-plan information. In the description below, the estimation period is one year, starting on "2007/4/1" and ending on "2008/3/31", and the interval is one day. Furthermore, as an example of the resource allocation, a case where processors are distributed to clients is described.

Figure 3:
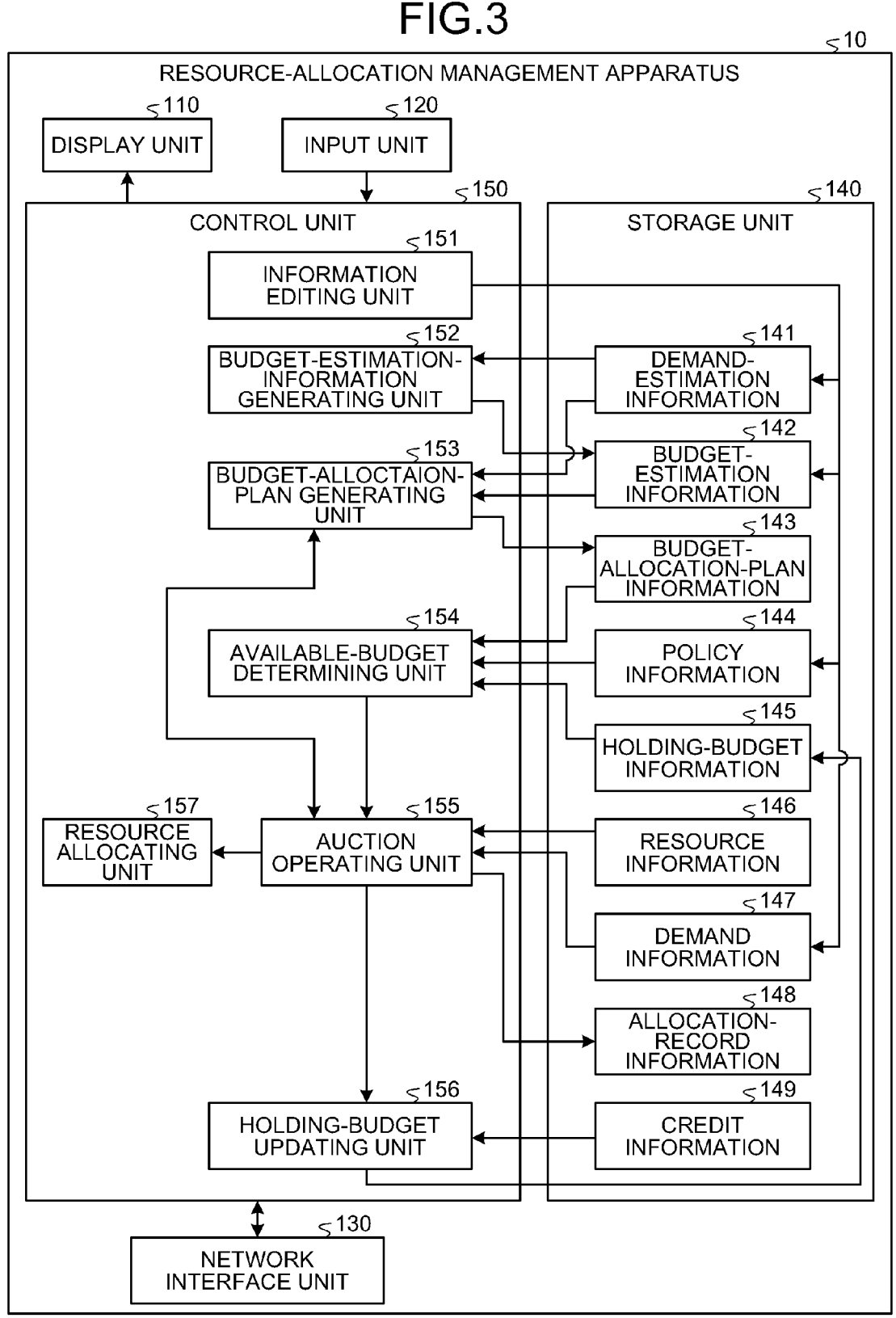
FIG. 3 is a block diagram illustrating the configuration of a resource allocation management apparatus.

FIG. 3 is a block diagram illustrating a configuration of the resource-allocation management apparatus 10. As illustrated in FIG. 3, the resource-allocation management apparatus 10 includes a display unit 110, an input unit 120, a network interface unit 130, a storage unit 140, and a control unit 150. The display unit 110 is a display device for displaying various kinds of information and is, for example, a liquid crystal display apparatus. The input unit 120 is an input device for inputting various kinds of information and control instructions and is, for example, a keyboard and a mouse. The network interface unit 130 is an interface apparatus for controlling transmission where information is communicated with other apparatuses on a network.

The storage unit 140 is a storage device for storing various kinds of information and stores demand-estimation information 141, budget-estimation information 142, budget-allocation-plan information 143, policy information 144, holding-budget information 145, resource information 146, demand information 147, allocation-record information 148, and credit information 149.

The demand-estimation information 141 is information indicating an estimation value of the amount of resources each client needs for each interval during the estimation period. An example of the demand-estimation information 141 is illustrated in FIG. 4. As illustrated in FIG. 4, the demand-estimation information 141 includes items, such as client ID, interval, and the necessary amount of resources. A plurality of combinations of the interval and the necessary amount of resources can be stored for each client ID. The client ID is an identifier for identifying a client. The interval is the time and date for specifying the interval. The necessary amount of resources is the number of PGs indicating the amount of resources needed for the interval.

The first to third lines of the demand-estimation information 141 illustrated in FIG. 4 indicate that a client, corresponding to the client ID "client A", needs four PGs of resources on 2007/4/1, five PGs of resources on 2007/4/2, and four PGs of resources on 2007/4/3.

The demand-estimation information 141 is generated by a processing unit (not illustrated) on the basis of a measurement result on how much load (e.g., traffic amount on a network) the network service of each client caused in the past. Specifically, the load on the network service of each client is measured at intervals, and then the measurement result for the corresponding interval is processed, e.g., multiplied by a predetermined coefficient, so that the amount of resources each client needs for each interval is calculated. The demand-estimation information 141 may not be generated on the basis of the measurement result of load of network services but may be generated on the basis of the allocation-record information 148, which is an allocation record of resources in the past. Furthermore, the demand-estimation information 141 may be generated on the basis of a request from clients.

The budget-estimation information 142 is information indicating an estimation value of a budget that becomes available to each client for an auction for each interval during the estimation period. An example of the budget-estimation information 142 is illustrated in FIG. 5. As illustrated in FIG. 5, the budget-estimation information includes items, such as client ID, interval, and additional budget. A plurality of combinations of the interval and the additional budget can be stored for each client ID. The client ID is an identifier for identifying a client. The interval is the time and date for specifying the interval. The additional budget is a budget that becomes available for an auction during the interval.

The budget-estimation information 142 is generated by a budget-estimation information generating unit 152 of the control unit 150 on the basis of the demand-estimation information 141. Even for a client providing a network service that charges users money at the end of each month, the budget-estimation information 142 is set in a manner such that a budget is added at each interval. Income during a certain interval is divided into additional budgets for each interval before the next interval for obtaining income. Such a simple model, in which a budget is obtained for each interval, is adopted for all clients, and, as a result, the generating process of the budget-allocation-plan information 143 can be simplified.

The budget-allocation-plan information 143 is information determining the proportion of budget each client should use for an auction during each interval during the estimation period. An example of the budget-allocation-plan information 143 is illustrated in FIG. 6. As illustrated in FIG. 6, the budget-allocation-plan information 143 includes items, such as client ID, interval, and budget-consumption rate. A plurality of combinations of the interval and the budget-consumption rate can be stored for each client ID. The client ID is an identifier for identifying a client. The interval is the time and date for specifying the interval. The budget-consumption rate is the proportion indicating how much of the additional budget is to be used for an auction during the interval.

The first line of the budget-allocation-plan information 143 illustrated in FIG. 6 indicates that the budget-consumption rate on 2007/4/1 of a client, corresponding to the client ID "client A", is 80%, and the fifth line of the budget-allocation-plan information 143 indicates that the budget-consumption rate on 2007/12/1 of a client, corresponding to the client ID "client A", is 120%. As illustrated, the budget-consumption rate can exceed 100%.

When the budget-consumption rate is lower than 100%, the budget used for an auction is lower than the additional budget. Therefore, not all of the additional budget for the interval is used for an auction and some of the additional budget is carried over for the next auction. Depending on the result of an auction, some of the additional budget is carried over for the next auction regardless of the budget-consumption rate. When the budget-consumption rate is higher than 100%, the additional budget for the interval plus the budget that has been carried over from the auctions in the past is consumed.

The policy information 144 is information defining a policy upon which a client determines the upper limit of a budget he/she should use for an auction for each interval during the estimation period. The policy information 144 is edited by clients. An example of the policy information 144 is illustrated in FIG. 7. As illustrated in FIG. 7, the policy information 144 includes items, such as client ID, section, and value. A plurality of combinations of the section and the value can be stored for each client ID. The client ID is an identifier for identifying a client. The section and the value are a section and a value of an attribute value of a policy.

The first line of the policy information 144 illustrated in FIG. 7 indicates that the type of the selected policy is "Priority-Period Specified Type". The second to fourth lines indicate that the budget-consumption rate between 10/1 and 11/30 is 100%, the budget-consumption rate between 12/1 to 1/10 is 120%, and the budget-consumption rate during other periods is 80%. The detail of the policy, defined on the basis of the policy information 144, is described later.

The holding-budget information 145 is information indicating the budget each client can actually use for the next auction. An example of the holding-budget information 145 is illustrated in FIG. 8. As illustrated in FIG. 8, the holding-budget information 145 includes items, such as client ID, additional budget, and carry-over budget. One combination of the additional budget and the carry-over budget can be stored for each client ID. The client ID is an identifier for identifying a client. The additional budget is a budget that becomes available for an auction for the next interval. The carry-over budget is a budget that is carried over from the auctions of the past.

The first line of the holding-budget information 145 illustrated in FIG. 8 indicates that, for a client, corresponding to the client ID "client A", 60,000 yen becomes available for an auction for the next interval and 80,000 yen is carried over from the auctions of the past. The data in the first line indicates that the client, corresponding to the client ID "client A", can use 140,000 yen for the auction for the next interval.

The resource information 146 is information indicating how resources are divided. An example of the resource information 146 is illustrated in FIG. 9. As illustrated in FIG. 9, the resource information includes items, such as PGID and host.

One host can be stored for each PGID. The PGID is an identifier for identifying a PG. The host is a list of hosts that include processors constituting the PG.

The first line of the resource information illustrated in FIG. 9 indicates that a PG, corresponding to the PGID "PG01", consists of processors included in the hosts "serv01" and "serv02". In the example of the resource information 146 illustrated in FIG. 9, the number of hosts corresponding to each PG is different, but the processing power in total is the same. As illustrated, PGs are constituted by a combination of hosts including the processors with different processing power in a manner such that the processing ability of each PG is the same. Therefore, the auction model can be simplified, and the generation process of the budget allocation plan can be easily realized.

The demand information 147 is information indicating the amount of resources each client needs for each interval. The demand information 147 is generated by a processing unit (not illustrated) copying a content of the demand-estimation information 141. The demand information 147 has the same structure with the demand-estimation information 141.

The allocation-record information 148 is information indicating how resources are actually allocated to clients as a result of an auction at each interval. An example of the allocation-record information 148 is illustrated in FIG. 10. As illustrated in FIG. 10, the allocation-record information 148 includes items, such as interval, PGID, client ID, and successful bid price, and can store one combination of the PGID, the client ID, and the successful bid price for each interval. The interval is the time and date for specifying the interval. The PGID is an identifier for identifying a PG. The client ID is an identifier for identifying a client to whom the PG is allocated. The successful bid price is money used by the client for winning the bid on the PG.

The first line of the allocation-record information 148 illustrated in FIG. 10 indicates that, for the interval corresponding to 2007/4/1, a PG, corresponding to the PGID "PG01", is bought for 20,000 yen and allocated to a client, corresponding to the client ID "client A". The second line thereof indicates that, for the same interval, a PG, corresponding to the PGID "PG02", is bought for 40,000 yen and allocated to a client, corresponding to the client ID "client B".

The credit information is information indicating a budget that actually becomes available to each client for an auction. An example of the credit information 149 is illustrated in FIG. 11. As illustrated in FIG. 11, the credit information includes items, such as client ID, interval, and additional budget. A plurality of combinations of the interval and the additional budget can be stored for each client ID. The client ID is an identifier for identifying a client. The interval is time and date for specifying an interval or a period indicating a plurality of intervals. The additional budget is a budget that becomes available for an auction for the interval.

The first to third lines of the credit information 149 illustrated in FIG. 11 indicate, for a client corresponding to the client ID "client A", that for the interval, i.e., the period between 2007/4/1 and 2007/4/30, 1.8 million yen of a budget becomes available for an auction, that for the interval, i.e., the period between 2007/5/1 to 2007/5/31, 1.9 million yen of a budget becomes available for an auction, and that for the interval, i.e., the period between 2007/6/1 to 2007/6/30, 1.7 million yen of a budget becomes available for an auction, respectively.

The control unit 150 controls the resource-allocation management apparatus 10 entirely. The control unit 150 includes an information editing unit 151, the budget-estimation-information generating unit 152, a budget-allocation-plan generating unit 153, an available-budget determining unit 154, an auction operating unit 155, a holding-budget updating unit 156, and a resource allocating unit 157. The information editing unit 151, the budget-estimation-information generating unit 152, and the budget-allocation-plan generating unit 153 are used for processes of the plan phase. The available-budget determining unit 154, the holding-budget updating unit 156, and the resource allocating unit 157 are used for processes of the operation phase. The auction operating unit 155 is used for processes of both the plan phase and the operation phase.

The information editing unit 151 is a processing unit that displays an edit screen for editing various kinds of information stored in the storage unit 140 on the display unit 110 or a display unit of the information processing apparatus that is connected with the resource-allocation management apparatus 10 on a network so that a client can edit the content of these pieces of information. Specifically, the information editing unit 151 allows clients to edit the information related to themselves included in the demand-estimation information 141, the budget-estimation information 142, the policy information 144, and the demand information 147.

Figure 12:
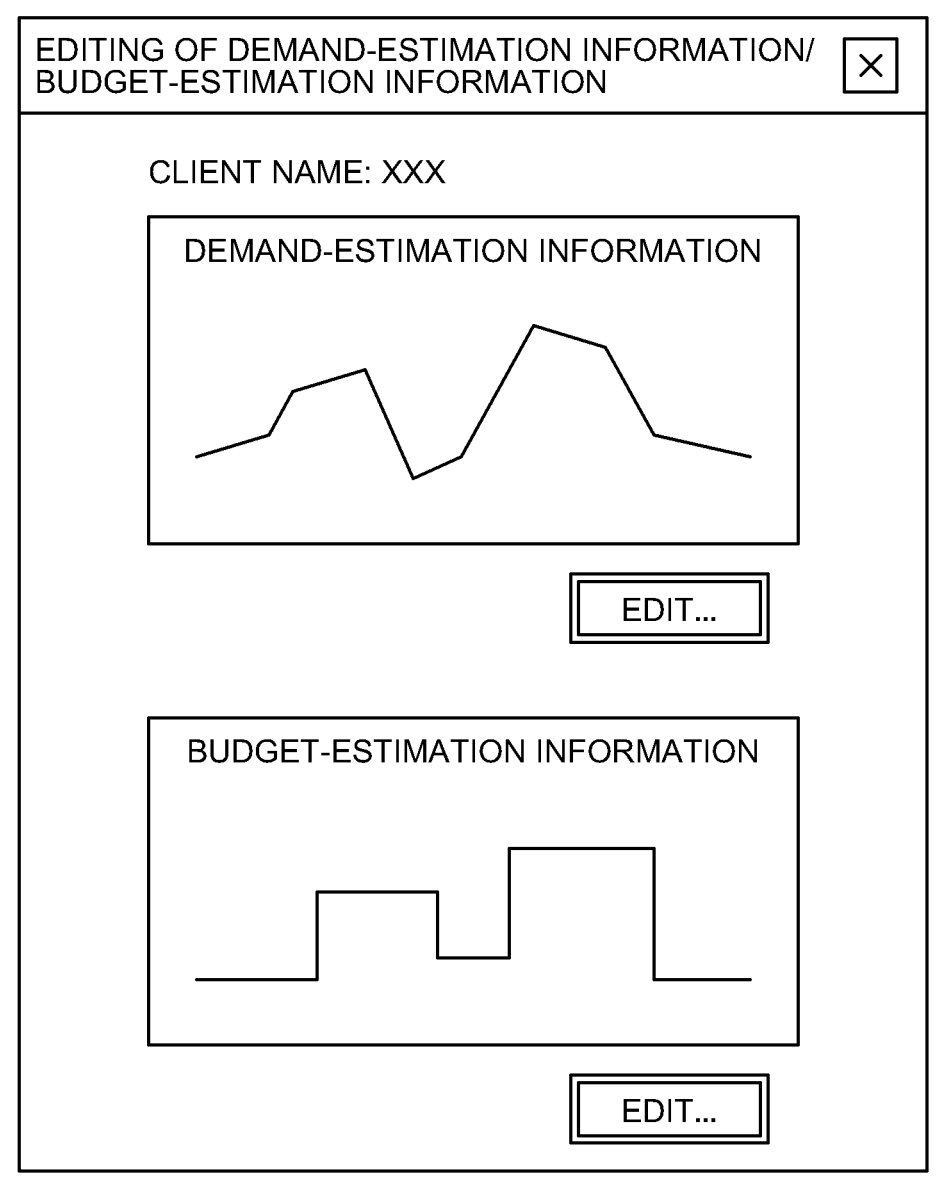

FIG. 12 is a diagram illustrating an exemplary edit screen of the demand estimation information 141 and the budget-estimation information 142. As illustrated in FIG. 12, the information editing unit 151 extracts information related to a specified client from the demand-estimation information 141 and the budget-estimation information 142 and then displays time-series fluctuations in the necessary amount of resources and the additional budget in a graph. As the fluctuations in the necessary amount of resources and the additional budget are displayed visually as illustrated, clients can easily determine whether these estimation values are accurate or not. When an edit button on the screen is pressed, a screen for editing the contents of the demand-estimation information 141 or the budget-estimation information 142 is displayed so that clients can edit the contents of the information. The editing of the demand-estimation information 141 and the budget-estimation information 142 by the clients is carried out before the generation of the budget-allocation-plan information 143 by the budget-allocation-plan generating unit 153.

FIG. 13 is a diagram illustrating an example of an edit screen of the policy information 144. As illustrated in FIG. 13, the information editing unit 151 extracts information of a client who is specified according to the policy information 144 and then displays the information as an edit screen. FIG. 13 illustrates an example of an edit screen for editing the policy information of a client who corresponds to the client ID "client A" illustrated in FIG. 7. Furthermore, values of the additional budget and the carry-over budget are obtained from the holding-budget information 145 and displayed in an upper part as additional information.

In the example, the client can specify a policy, simple type or priority-period specified type. With the simple type policy, all budgets including the carry-over budget are used for each interval. With the priority-period specified type policy, the budget-consumption rate can be determined by the client for each specified interval. In the edit screen, the client can specify the period during which the budget-consumption rate is changed and the changed budget-consumption rate arbitrarily.

The editing of the policy information 144 by the client can be carried out at any time of the operation phase as well as the plan phase. When the client changes the contents of the policy information 144 of the client, the result is reflected on the auction of the next intervals. In the auction at each phase, two types of budget efficiency are calculated for each client. One is for a case in which the upper limit of the budget is determined on the basis of the budget-allocation-plan information 143, and the other is for a case in which the upper limit of the budget is determined on the basis of the policy set by the client. Then the auction is carried out with the upper limit of the budget with higher budget efficiency.

The policy illustrated in FIGS. 7 and 13 are merely exemplary, and policies of other types may be selected by clients. For example, clients may select a policy with which the budget-consumption rate can be arbitrarily determined by the clients for each type of transactions such as commodity search and cash settlement.

The budget-estimation-information generating unit 152 is a processing unit that generates the budget-estimation information 142 on the basis of the demand-estimation information 141 at the plan phase. Specifically, the budget-estimation-information generating unit 152 calculates the additional budget of each client for each interval by multiplying the necessary amount of resources of the demand-estimation information 141 by a predetermined coefficient, which is determined considering a profit ratio of network services provided by the clients. The estimation of the additional budget is based on the assumption that the more resources are allocated to a client, the higher income the client can obtain.

After calculating the additional budget of each client for each interval, the budget-estimation-information generating unit 152 executes a leveling process on the additional budget in correspondence with the pattern how the client earns income. For example, when an interval for a client to obtain income (hereinafter, "income interval") is one month, the budget-estimation-information generating unit 152 collects and sums up estimation values on the additional budget of each interval in a month, and then splits and allocates the sum equally to each interval of the month. The sum may not be allocated equally and, instead, the proportion allocated to each interval may be customized according to a policy that is set previously by the client. For example, when the income interval is one month and the client needs more of resources at the beginning of a month, the policy may be set in a manner such that more of a budget is allocated to the interval at the beginning of a month.

The allocation of the sum described above is based on the assumption that the budget needed for securing as much resources as needed for a certain income interval is secured before the beginning of the income interval. Instead, the allocation may be based on the assumption that the budget obtained during the income interval is used in order to secure as much resources as needed for the next income interval. When operated under such an assumption, the budget-estimation-information generating unit 152 does not allocate the sum of each income interval to each interval in the income interval but to each interval in the next income interval.

The budget-allocation-plan generating unit 153 is a processing unit that, at the plan phase, searches for an optimized value of the budget-consumption rate of each client for each interval during the estimation period and stores the result of search in the budget-allocation-plan information 143, so that all clients can obtain the maximum amount of resources with the minimum budget. The budget-allocation-plan generating unit 153 makes the auction operating unit 155 execute a simulation of auctions for all intervals during the estimation period on the basis of the budget-consumption rate that is temporarily set in order to obtain the optimized value of the budget-consumption rate, the demand-estimation information 141, and the budget-estimation information 142. Then the budget-allocation-plan generating unit 153 evaluates the result using an objective function.

The objective function for optimizing the budget-consumption rate of each client for each interval is preferably a cost efficiency function for each client, which is obtained by dividing the total amount of resources won by the clients in the simulation of auctions for all intervals, by the total amount of budget used by the client in the auctions for all intervals. That is because the most reasonable way to allocate a budget is to win more resources with less bidding money.

The search for the optimal decision variable can be realized, for example, using a search algorithm for solution space based on the mathematical programming method where the budget-consumption rate is the decision variable. Specifically, the optimal value of the decision variable can be obtained by searching for the value of the decision variable forming a two-dimensional array of the budget consumption rate where the first index is a number generated corresponding to each client and the second index is a number generated corresponding to each interval; the searched value leads to the maximum cost efficiency function described above.

The problem with the optimization of the budget allocation with the above method is that the number of decision variables amounts to the product of the number of clients and the number of intervals. At the data center, the number of clients hosting network services often exceeds 100. When the estimation period is one year and the interval is one day, the number of intervals amounts to 365. Thus, the number of decision variables can amount to several tens of thousands.

Suppose, for example, that the value of the decision variable is discrete. In order to execute once an operation of searching the optimal solution with Newton's method, the objective function needs to be evaluated for both cases where the $\Delta$ value is added to the current value of each decision variable and where the $\Delta$ value is subtracted therefrom. Then, the number of decision variables amounts to several tens of thousands, and the evaluation of the objective function needs to be performed for two to "several tens of thousandth" power times. Therefore, with the current performance of computers, it is not realistic to perform simple optimization without any twist.

In view of the above, the budget-allocation-plan generating unit 153 adopts the degeneration function described below, with which several parameters given to the degenerative function are optimized. The degeneration function is defined for each client. The degeneration function receives three types of parameters, i.e., several control parameters, parameters related to the demand level of resources for a single client, and parameters related to the demand level of resources for all clients, and calculates the budget-consumption rate of a client for each interval during the estimation period.

The value of the parameter related to the demand level of resources for a single client and the value of the parameter related to the demand level of resources for all clients are determined on the basis of the demand-estimation information 141 while the control parameter can be set arbitrarily. Change in the control parameter of the degeneration function of a client results in change in the budget-consumption rate of each interval that is calculated by the degeneration function considering the change in the control parameter and further results in change in the simulation result of the auction and the value of the cost efficiency function. Thus, by formulating an optimization problem using a group including all control parameters of degeneration function as the decision variable and a combination of the degeneration function and cost efficiency function as the objective function, the budget-allocation-plan information 143 can be generated in a short period of time.

Figure 14:
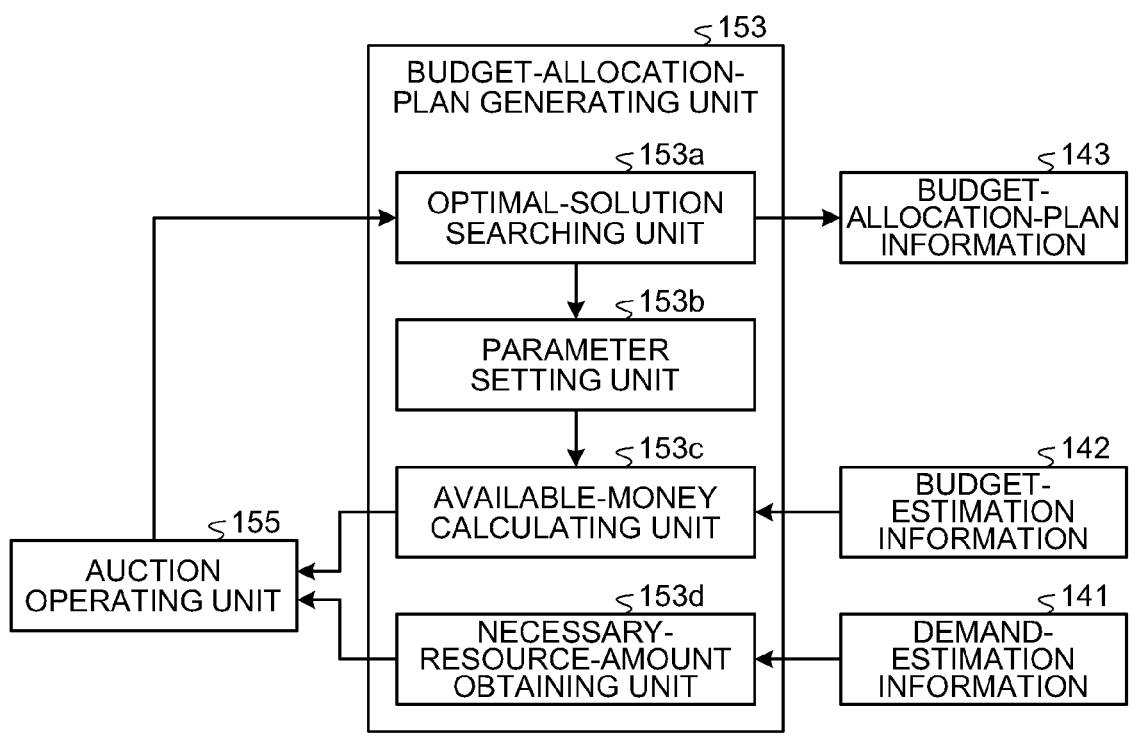
FIG. 14 is a diagram illustrating a detailed configuration of a budget-allocation-plan generating unit.

The detailed configuration of the budget-allocation-plan generating unit 153 is illustrated in FIG. 14. As illustrated in FIG. 14, the budget-allocation-plan generating unit 153 includes an optimal-solution searching unit 153a, a parameter setting unit 153b, an available-money calculating unit 153c, and a necessary-resource-amount obtaining unit 153d.

The optimal-solution searching unit 153a controls search for the optimal solution. Specifically, the optimal-solution searching unit 153a sets the search direction of the solution search and makes the parameter setting unit 153b set a control parameter directed in the search direction. On the basis of the auction that is simulated with the budget-consumption rate of each client for each interval calculated using the control parameter being applied, the optimal-solution searching unit 153a sets the search direction of the solution search again. The above-described process is repeated until the search of a solution area is completed. Then, the optimal-solution searching unit 153a stores the budget-consumption rate of each client for each interval with which the value of the objective function is optimal in the budget-allocation-plan information 143.

The parameter setting unit 153b sets a control parameter of the degeneration function of each client according to the search direction that is set by the optimal-solution searching unit 153a. Using the control parameter that is set by the parameter setting unit 153b, the available-money calculating unit 153c calculates the budget-consumption rate of each client for each interval. Then, on the basis of the calculated budget-consumption rate and the budget-estimation information 142, the upper limit of a budget each client uses for a simulation of an auction of each interval is calculated. The necessary-resource-amount obtaining unit 153d obtains the amount of resources each client needs for each interval on the basis of the demand-estimation information 141.

The upper limit of the available budget, which has been calculated by the available-money calculating unit 153c, and the amount of resources, which has been obtained by the necessary-resource-amount obtaining unit 153d, are input to the auction operating unit 155. On the basis of the input information, the auction operating unit simulates the auctions for all intervals during the estimation period and then sends the result to the optimal-solution searching unit 153a.

An example of various kinds of functions used by the budget-allocation-plan generating unit 153 is described below. The following formula (1) is an example of a degeneration function DG for calculating a budget-consumption rate "bid_rate[τ,t]" of a client τ for an interval t.

$$\text{bid\_rate}[\tau,t] = DG(\alpha,\beta,t,\tau,\lambda_1^\tau,\lambda_2^\tau,\ldots,\lambda_p^\tau) \quad (1)$$

In the formula above, $\lambda_1^\tau$ to $\lambda_p^\tau$ represent control parameters of the client τ, α represents the ratio of the necessary amount of resources of the client τ for the interval t to the amount at the peak, β represents a competition rate for obtaining resources for the interval t; α can be obtained using the following formula (2), and β can be obtained using the following formula (3).

$$\alpha = \frac{R(\tau, t)}{\max_t R(\tau, t)} \quad (2)$$

$$\beta = \frac{\sum_t R(\tau, t)}{RT} \quad (3)$$

In the formula above, R(τ,t) represents the amount of resources of the client τ needs for the interval t, and RT represents the total amount of resources at the data center.

The objective function for calculating the cost efficiency Fopt$^\tau$ of the client τ can be given as the following formula (4).

$$Fopt^\tau = \frac{\sum_t [\omega_\tau^t \times A(\tau, t)] / \sum_t \omega_\tau^t}{\sum_t [\text{budget}\,[\tau, t] \times \text{bid\_rate}\,[\tau, t]]} \quad (4)$$

In the formula above, A(τ,t) represents the amount of resources the client τ obtains for the interval t, $\omega_\tau^t$ represents the amount of income the client earns every time he/she obtains the predetermined amount of resources for the interval t, and budget [τ,t] represents the additional budget of the client τ for the interval t.

Referring back to FIG. 3, the available-budget determining unit 154 is a processing unit that determines, before the auctions for each interval during the operation phase are carried out, the upper limit of the budget used for an auction for each client on the basis of the budget-allocation-plan information 143 or the policy information 144.

Specifically, on the basis of the budget-allocation-plan information 143 and the holding-budget information 145, the available-budget determining unit 154 calculates the upper limit of the budget used for an auction of the next interval for each client and then makes the auction operating unit 155 simulate the auction with the upper limit applied. The upper limit of the available budget is calculated by multiplying the additional budget in the holding-budget information 145 by the budget consumption rate of the next interval in the budget-allocation-plan information 143. When the calculated amount is higher than the sum of the additional budget and the carry-over budget in the holding-budget information 145, the sum of the additional budget and the carry-over budget is the upper limit of the available budget.

Then, on the basis of the policy information 144 and the holding-budget information 145, the available-budget determining unit 154 calculates the upper limit of the budget used for an auction of the next interval for each client and then makes the auction operating unit 155 simulate the auction with the upper limit applied. When the policy selected by the client is priority-period specified type, the upper limit of the available budget is calculated using the budget-consumption rate of the period similarly to the description above. When the policy selected by the client is simple type, the sum of the additional budget and the carry-over budget is the upper limit of the available budget.

The available-budget determining unit 154 calculates a budget efficiency where the upper limit of the available budget is calculated on the basis of the budget-allocation-plan information 143 and a budget efficiency where the upper limit of the available budget is calculated on the basis of the policy information 144 for each client. Comparing the budget efficiencies of the client with each other, the available-budget determining unit 154 determines that the upper limit of the budget of the higher budget efficiency is the upper limit of the budget the client uses for the auction of the next interval.

The budget efficiency is a numerical value that indicates how efficiently, in terms of cost, a client can win more resources in the auction using a given bidding money. The budget efficiency Beff$_t^\tau$ of the client τ for the interval t can be calculated, for example, using the following formula (5). In the formula (5), $bid_\tau^t$ represents the budget the client $\tau$ uses for the interval t.

$$Beff_t^\tau = \frac{A(\tau, t) / \sum_t A(\tau, t)}{bid_t^\tau / \sum_t bid_t^\tau} \quad (5)$$

As described, the resource-allocation management apparatus 10 determines the upper limit of money each client uses for an auction using not only the budget-consumption rate that is previously optimized but also the budget-consumption rate based on the policy actively selected by the client. If the upper limit of money each client uses for an auction is determined on the basis of the optimized budget-consumption rate only, the problem described below may occur.

Firstly, because clients may complain about the fact that the auction process, despite being called an auction, does not allow them to participate in the process of determining the market rate and the bidding money, they may develop a sense of distrust against the business of the data center vendor. Secondly, because the optimization of the budget allocation of clients by the resource-allocation management apparatus 10 is carried out on the basis of the demand-estimation information 141 and the budget-estimation information 142 only, the budget allocation may not be preferable considering unique factors of each client.

For example, when a certain client hosts electric commerce transaction service at the data center for selling commodities with significantly high inventory carrying cost over the Internet, it is important to consider the inventory quantity of the commodities and inventory time of each commodity for each interval and also loss in discarding the commodities with expired inventory time before estimating the amount of resources needed for each interval and the available budget for an auction thereof.

The resource-allocation management apparatus 10 determines the upper limit of money each client uses for an auction using the budget-consumption rate based on the policy actively selected by the client so that the optimal budget allocation can be easily provided for the client with such unique factors.

To respect the client's demand, the upper limit of the available budget that is calculated on the basis of the policy information 144 may be the upper limit of the budget the client uses for the auction of the next interval, even when the upper limit of the available budget calculated on the basis of the policy information 144 is inferior in terms of the budget efficiency but the difference of the budget efficiencies is within the predetermined threshold value. Further, the two calculated upper limits and the corresponding budget efficiencies may be presented to the client so that the client can select the upper limit of the budget the client uses for the auction of the next interval.

The auction operating unit 155 is a processing unit that carries out an auction whose commodities are PGs registered in the resource information 146. When a simulation of an auction is requested from the budget-allocation-plan generating unit 153, the auction operating unit 155 obtains the amount of resources each client needs and the upper limit of the budget each client uses from the auction operating unit 155 and then responds to the budget-allocation-plan generating unit 153 with the result of the auction. Further, when a simulation of an auction is requested from the available-budget determining unit 154, the auction operating unit 155 obtains the amount of resources each client needs for the next interval from the demand information 147, obtains the upper limit of the budget each client uses from the available-budget determining unit 154, and responds to the available budget determining unit 154 with the result of the auction.

Further, at a predetermined time and date when the resource allocation for the next interval is to be determined, the auction operating unit 155 obtains the amount of resources each client needs for the next interval from the demand information 147 and obtains the upper limit of the budget each client uses from the available-budget determining unit 154. Then, the auction operating unit 155 sends the result of the auction to the resource allocating unit 157 and adds the result to the allocation-record information 148. Details of the method of carrying out the auction are described later.

The holding-budget updating unit 156 is a processing unit that updates the holding-budget information 145 on the basis of the result of carrying out an auction. Specifically, the holding-budget updating unit 156 sets the remaining budget, not used for an auction, as the carry-over budget in the holding-budget information 145 and sets the additional budget of the next interval in the credit information as the additional budget in the holding-budget information 145. When the income interval of a client is not based on each interval, the holding-budget updating unit 156 sets the value that is obtained by dividing the additional budget of the income interval by the number of intervals during the income interval or the value that is allocated according to the policy that is set by the client, as the additional budget in the holding-budget information 145.

The resource allocating unit 157 is a processing unit that allocates each PG to the client who won the PG in the auction corresponding to the interval.

Figure 15:
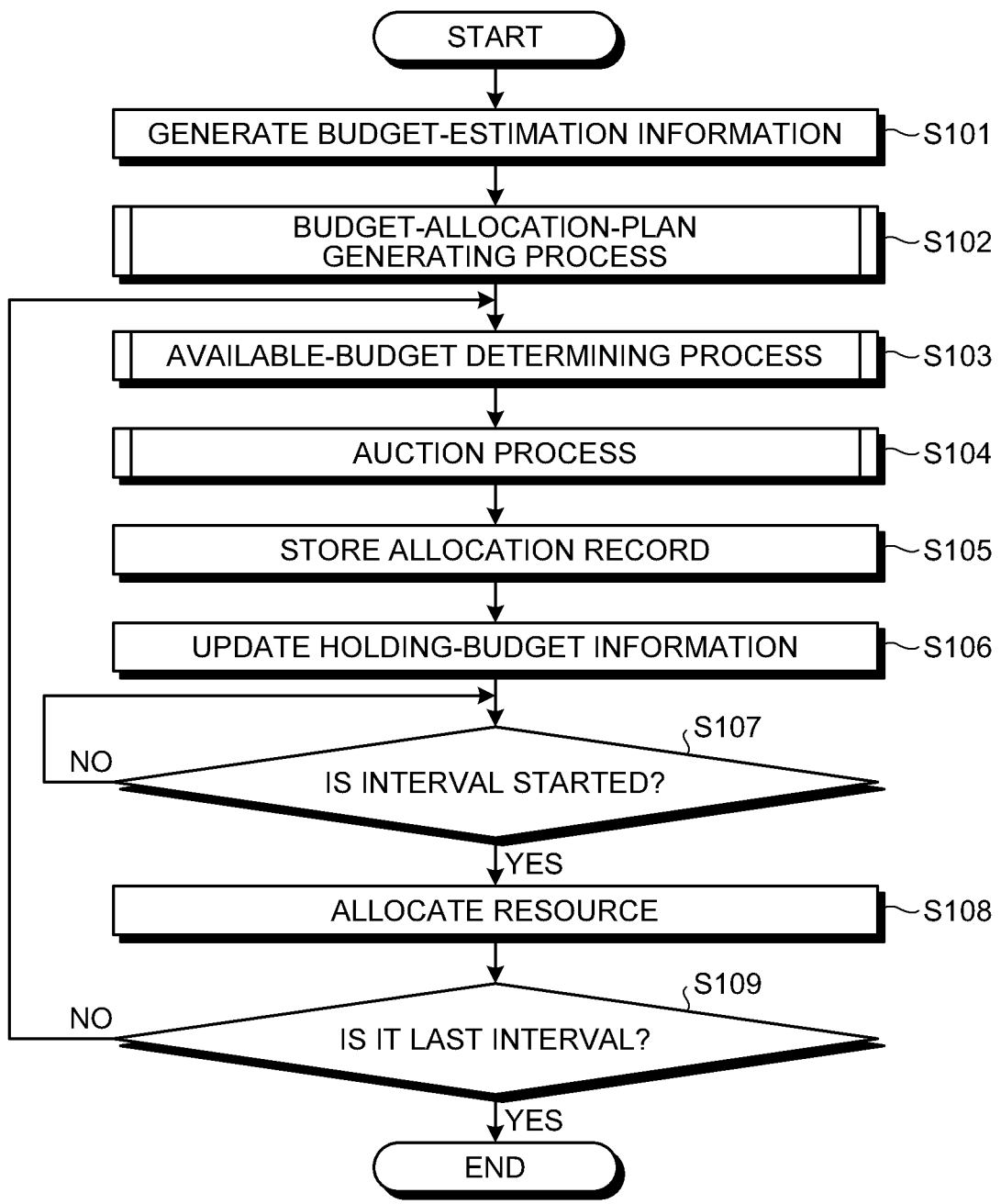
FIG. 15 is a flowchart illustrating an overall flow of processes performed by a resource-allocation management apparatus corresponding to the estimation period.

The procedure of the resource-allocation management apparatus 10 is described below. FIG. 15 is a flowchart illustrating an overall flow of processes performed by the resource-allocation management apparatus 10 corresponding to the estimation period. As illustrated in FIG. 15, the budget-estimation-information generating unit 152 generates the budget-estimation information 142 of the estimation period on the basis of the demand-estimation information 141 (Step S101). The modification of the demand estimation information 141 and the budget-estimation information 142, if needed, is carried out at this timing.

The budget-allocation-plan generating unit 153 performs the budget-allocation-plan generating process described later and generates the budget-allocation-plan information 143 of the estimation period on the basis of the demand-estimation information 141 and the budget-estimation information 142 (Step S102). After the budget-allocation-plan information 143 is generated as described above, the following processes are performed for each interval during the estimation period.

The available-budget determining unit performs the available-budget determining process described later and determines the upper limit of the budget each client uses in the next auction (Step S103). On the basis of the result of the determination, the auction operating unit 155 performs the auction process described later and determines which PG is allocated to which client (Step S104). The auction operating unit 155 stores the result in the allocation-record information 148 (Step S105), and the holding-budget updating unit 156 updates the budget information of each client in the holding-budget information for the next auction (Step S106).

When the interval corresponding to the auction being performed starts (Step S107: Yes), the resource allocating unit

157 allocates the resources to the clients on the basis of the result of the auctions performed by the auction operating unit 155 (Step S108). When the interval is the last interval in the estimation period (Step S109: Yes), the series of processes for the estimation period are completed. When it is not (Step S109: No), the procedures starting from Step S103 are repeated for the next interval.

Figure 16:
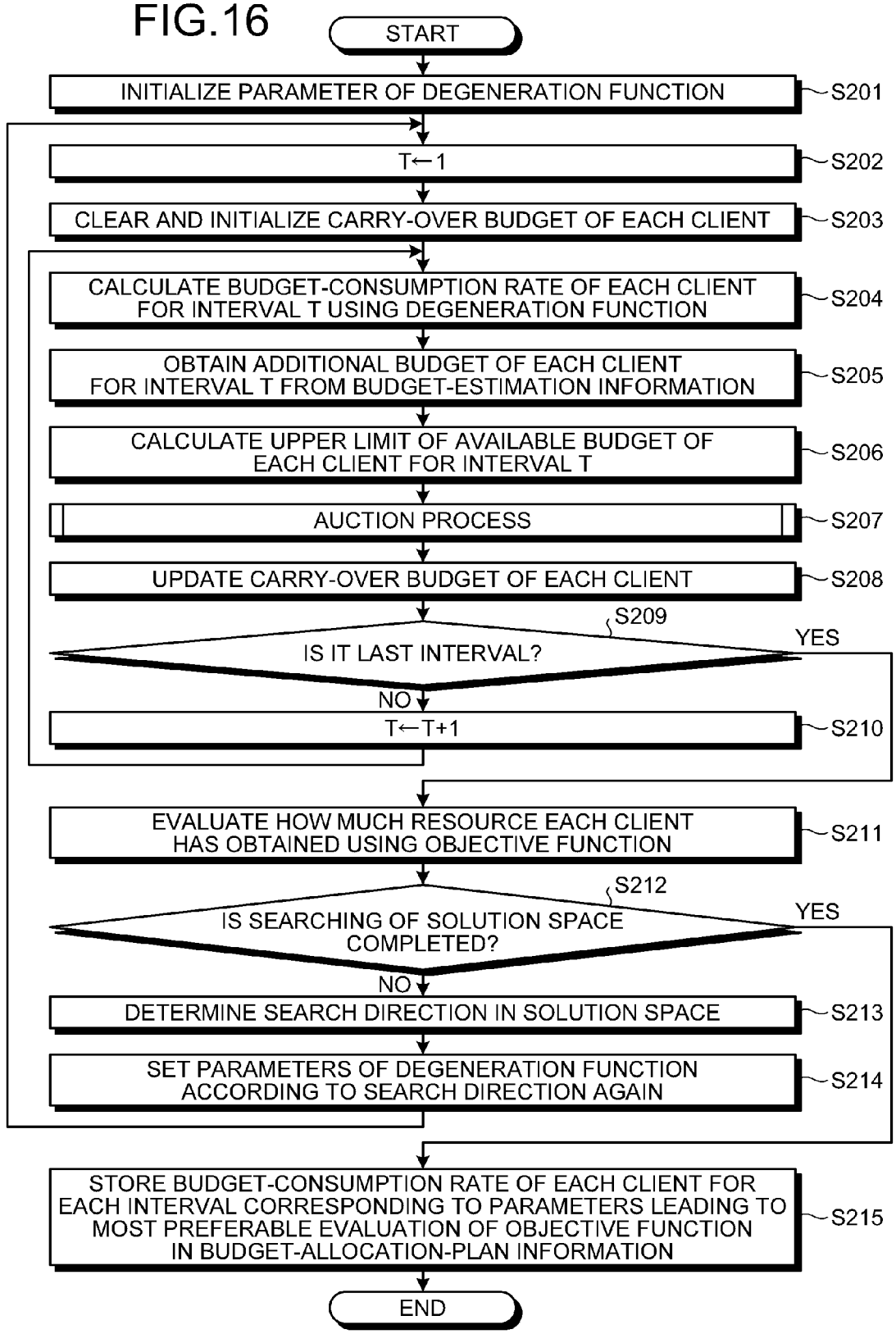
FIG. 16 is a flowchart illustrating a procedure of a budget-allocation-plan information generating unit.

FIG. 16 is a flowchart illustrating a procedure of the budget-allocation-plan generating process. As illustrated in FIG. 16, the parameter setting unit 153b initializes the control parameters of the degeneration functions according to the search direction that is set by the optimal-solution searching unit 153a (Step S201). Then, the budget-estimation-information generating unit 152 initializes the variable T, which represents the interval, at 1 (Step S202), and clears and initializes the carry-over budgets of each client temporarily stored in the memory (not illustrated) (Step S203).

The available-money calculating unit 153c calculates the budget-consumption rate of each client for the interval T using the degeneration function (Step S204). The available-money calculating unit 153c obtains the estimation value of the additional budget of each client for the interval T from the budget-estimation information 142 (Step S205), multiplies the estimation value by the budget-consumption rate of each client calculated at Step S204, and then calculates the upper limit of the available budget of each client for the interval T (Step S206).

After the upper limit of the available budget is calculated, the budget-estimation-information generating unit 152 makes the auction operating unit 155 perform the auction process described later so that the auction is simulated (Step S207). As a result of the simulation, the budget-estimation-information generating unit 152 updates the carry-over budget of each client temporarily stored in the memory (not illustrated) (Step S208). When the interval T is not the last interval of the estimation period (Step S209: No), T is incremented by 1 (Step S210), and the procedures starting from Step S204 are repeated.

When the interval T is the last interval of the estimation period, i.e., when the simulation of the auctions for all intervals of the estimation period is performed with the control parameters being set currently (Step S209: Yes), the optimal-solution searching unit 153a evaluates, using an objective function, the status on how much resources each client has obtained (Step S211). If the searching of the solution space is not completed (Step S212: No), the optimal-solution searching unit 153a determines the search direction in the solution space (Step S213), and the parameter setting unit sets again the control parameters of the degeneration function according to the search direction (Step S214), and then the procedures starting from Step S202 are repeated.

When the searching of the solution space is completed (Step S212: Yes), the optimal-solution searching unit 153a stores the budget-consumption rate of each client for each interval in the budget-allocation-plan information 143; the budget-consumption rate corresponds to the control parameters leading to the most preferable result with the objective function (Step S215). A case where the most preferable result is obtained with the objective function is a case where the most preferable results are obtained for all clients. When the objective function is a function for obtaining the cost efficiency for each client, for example, a case where any one of results obtained by evaluating the objective function for each client is more preferable than the predetermined value can be a case where the most preferable result is obtained.

Figure 17:
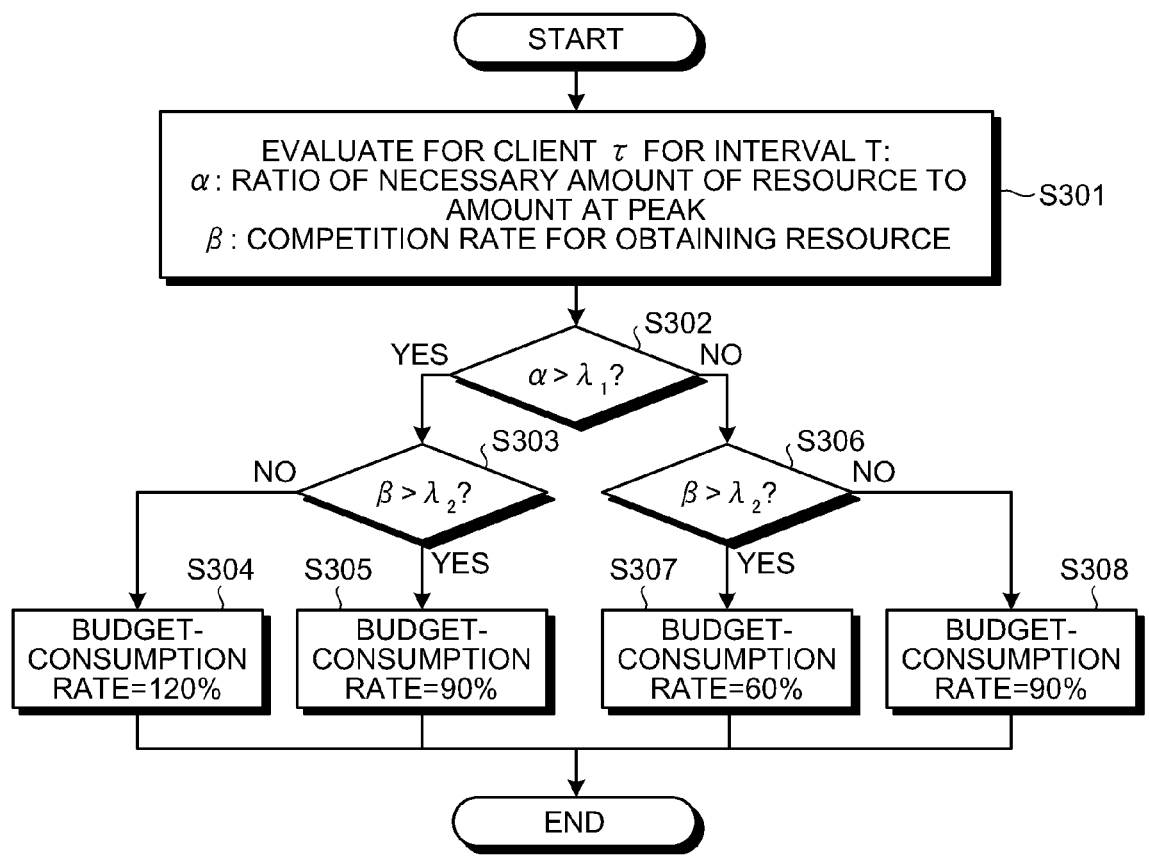
FIG. 17 is a flowchart illustrating exemplary decision logic of a budget consumption rate based on a degeneration function.

FIG. 17 is a flowchart illustrating exemplary decision logic of a budget consumption rate based on a degeneration function. FIG. 17 illustrates an example where a control variable is used as a threshold value. As illustrated in FIG. 17, with the degeneration function, the ratio of the amount of resources the client τ needs for the interval T to the amount at the peak, i.e., the demand level α for resources and the competition rate β for obtaining resources for the interval T, is evaluated (Step S301).

When the resource demand level α is higher than the first threshold value $\lambda_1$ (Step S302: Yes) and the competition rate β is equal to or lower than the second threshold value $\lambda_2$ (Step S303: No), the budget should be vigorously used to win as much resources as possible, and therefore the budget-consumption rate should be set at a high value, e.g., 120% (Step S304). When the resource demand level α is higher than the first threshold value $\lambda_1$ (Step S302: Yes) and the competition rate β is higher the second threshold value $\lambda_2$ (Step S303: Yes), the sufficient amount of resources may not be obtained even if the budget is used vigorously, and therefore the budget-consumption rate is set at a moderate value, e.g., 90% (Step S305).

When the resource demand level α is equal to or lower than the first threshold value $\lambda_1$ (Step S302: No) and the competition rate β is higher than the second threshold value $\lambda_2$ (Step S306: Yes), the budget should be saved, and therefore the budget-consumption rate is set at a low value, e.g., 60% (step S307). When the resource demand level α is equal to or lower than the first threshold value $\lambda_1$ (Step S302: No) and the competition rate β is equal to or lower than the second threshold value $\lambda_2$ (Step S306: No), the sufficient amount of resources is likely to be obtained, and therefore the budget-consumption rate is set at a moderate value, e.g., 90% (Step S308).

Figure 18:
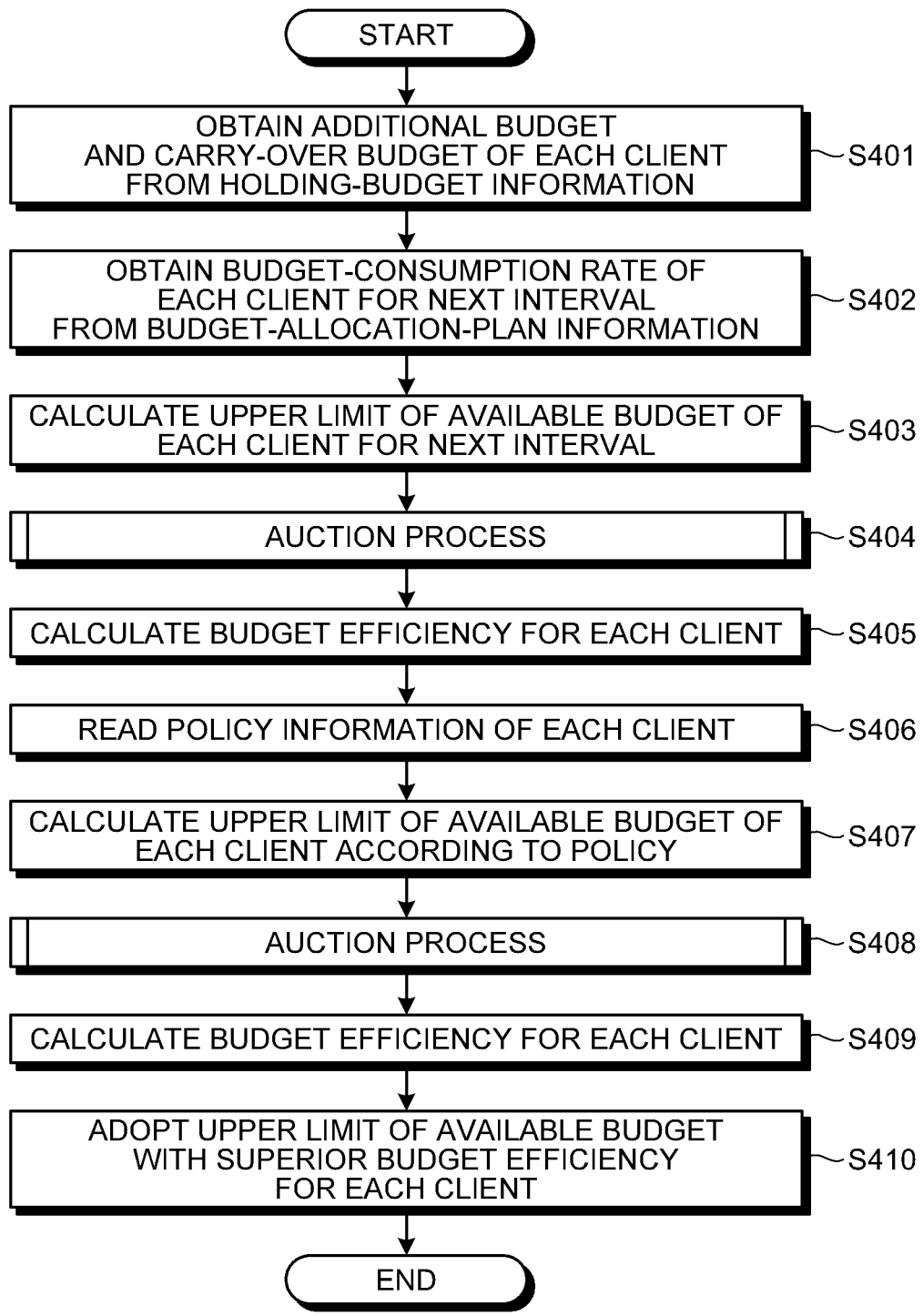
FIG. 18 is a flowchart illustrating a procedure of an available-budget determining process.

FIG. 18 is a flowchart illustrating a procedure of the available-budget determining process. As illustrated in FIG. 18, the available-budget determining unit 154 obtains the additional budget and the carry-over budget of each client from the holding-budget information 145 (Step S401) and obtains the budget-consumption rate of each client for the next interval from the budget-allocation-plan information 143 (Step S402). Then, on the basis of the obtained information, the available-budget determining unit 154 calculates the upper limit of the available budget for the next interval (Step S403) and makes the auction operating unit 155 perform the auction process described later to simulate the auction (Step S404). On the basis of the result of the simulation of the auction, the available-budget determining unit 154 calculates the budget efficiency for each client (Step S405).

The available-budget determining unit 154 obtains the setting of policy of each client from the policy information 144 (Step S406) and, calculates the upper limit of the available budget of each client for the next auction on the basis of the setting of policy (Step S407). The available-budget determining unit 154 makes the auction operating unit 155 perform the auction process described later to simulate the auction (Step S408), and calculates the budget efficiency for each client on the basis of the result of the simulation of the auction (Step S409).

The available-budget determining unit 154 compares the budget efficiencies for each client and sets the upper limit of the available budget corresponding to the superior budget efficiency as the upper limit of budget the client uses in the next auction (Step S410).

FIG. 19 is a flowchart illustrating a procedure of an auction process. The auction operating unit 155 opens a virtual auction for each PG in the information processing apparatus. In the auction, virtual characters corresponding to each client compete with each other by their bid prices, and then the PG is allocated to the virtual character who has offered the highest bid price. The virtual auction with the virtual characters for each PG can be realized, for example, by generating an object into which proper attributes and methods are incorporated. In the description of the procedure below, the virtual character corresponding to the client is referred to simply as "client" for convenience of the description.

As illustrated in FIG. 19, the auction operating unit 155 opens a virtual auction for each PG and sets a lowest bid price for each auction (Step S501). With the lowest price being set as described above, the data center can prevent a case where the successful bid price is unreasonably low from happening and can secure reasonable profit.

The auction operating unit 155 lets all clients participate in a number of auctions corresponding to the number of PGs they need (Step S502). The bid price of each client is obtained by dividing the upper limit of budget available for the auction by the number of PGs in participation. When the bid price is lower than the lowest price, the lowest price is set as the bid price. In this case, the number of PGs in participation is adjusted so that the sum of the bid prices does not exceed the available budget. When the auction operating unit 155 lets the clients participate in the auctions, it is preferable that the clients be divided and the number of participating clients be averaged among the PGs.

In each auction, the auction operating unit 155 sets a client who is the only one participating in the auction as the winner of the auction (Step S503). The auction operating unit 155 sets a completion flag on a client who is the winner of all auctions to which the client participates in (Step S504) and also sets a completion flag on a client who does not participate in any auction (Step S505). When the completion flag is set on all clients (Step S506: Yes), the auction process is finished.

When there are clients without the completion flag (Step S506: No), the auction operating unit 155 selects one of these clients (step S507). When the selected client has no remaining available budget (Step S508: No), the auction operating unit 155 kicks the client out of an auction where the client is losing by highest gap and then reuses the bid price for the auction as the available budget of the client (Step S509). As described, when the client runs out of a budget, the client is kicked out of an auction in which the client is unlikely to win so that the budget of the client can be reused for overcoming the weak position in other PG auctions.

The auction operating unit 155 updates the bid price for one of the auctions the client participate in where the losing gap is minimum and the highest bid price is lowest (Step S510). Specifically, when 1 yen plus the gap between the highest bid price and the current bid price of the client can be used, the client offers the 1 yen plus gap as the bid price for the auction, and when the price cannot be used, the client adds the entire remaining available budget to the bid price.

When there are other clients who are without the completion flag and not selected yet (Step S511: No), the auction operating unit 155 returns to Step S507, selects one of such clients, and repeats the procedures starting from Step S508. When all the clients without the completion flag are selected (Step S511: Yes), the auction operating unit 155 restarts the procedure starting from Step S503.

The configuration of the resource-allocation management apparatus 10 in accordance with the present embodiment illustrated in FIG. 3 may be modified in various ways without departing from the gist of the present invention. For example, the functions of the control unit 150 in the resource-allocation management apparatus 10 may be implemented as software, which is executes by a computer, so that the functions equivalent to the resource-allocation management apparatus 10 can be realized. The following describes an example of a computer that executes a resource-allocation management program 1071, which is software implementing the functions of the control unit 150.

FIG. 20 is a functional block diagram illustrating a computer 1000 that executes the resource-allocation management program 1071. The computer 1000 includes a CPU (Central Processing Unit) 1010 that executes various kinds of calculation processes, an input apparatus 1020 that receives the data input from users, a monitor 1030 that displays various kinds of information, a medium reading apparatus 1040 that reads programs and the like from recording mediums, a network interface apparatus 1050 that performs data transmission/reception with other computers, a RAM (Random Access Memory) 1060 that temporarily stores various kinds of information, and a hard-disk apparatus 1070. These components are connected on a bus 1080.

The hard-disk apparatus 1070 stores the resource-allocation management program 1071 that has the functions equivalent to the control unit 150 illustrated in FIG. 3, and resource-allocation management data 1072 corresponding to various kinds of data stored in the storage unit 140 illustrated in FIG. 3. The resource-allocation management data 1072 may be dispersed as needed, i.e., may be stored in other computers connected on a network.

The CPU 1010 reads the resource-allocation management program 1071 from the hard-disk apparatus 1070 and loads the resource-allocation management program 1071 on the RAM 1060. The resource-allocation management program 1071 then functions as a resource-allocation management process 1061. The resource-allocation management process 1061 loads information read from the resource-allocation management data 1072 on the allocated area on the RAM 1060 and performs various kinds of data processes on the basis of the loaded data and the like.

The resource-allocation management program 1071 described above may not be necessarily stored in the hard-disk apparatus 1070 and, instead, may be stored in the recording medium, e.g., CD-ROM, which can be read by the computer 1000. The resource-allocation management program 1071 may be stored in other computers (or servers) that are connected with the computer 1000 via public lines, the Internet, LAN (Local Area Network), WAN (Wide Area Network) or the like so that the computer 1000 can read therefrom and execute the resource-allocation management program 1071.

As described above, in the embodiment, the budget-allocation-plan generating unit 153 generates the budget-allocation-plan information 143 on the basis of the demand-estimation information 141 and the budget-estimation information 142. Therefore, not only the demands of individual clients but also relations of demands of each client are considered, so that the resource for each interval can be properly allocated for all clients.

According to an embodiment, the resources can be allocated considering unique factors of clients.

According to an embodiment, the resources can be allocated reflecting the will of clients.

According to an embodiment, the resource allocation that allows all clients to obtain the resources with the optimal cost efficiency can be realized.

According to an embodiment a budget-estimation-information can be generated preferably considering the necessary amount of resources.

A method, apparatus, a computer program, a recording medium, or a data structure to which a component, an idea, or any combination of components of the present invention is applied is counted as embodiments of the present invention.

According to an embodiment, not only the demands of individual clients but also relations of demands of each client are considered, so that a budget for each interval can be properly allocated for all clients.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein a resource-allocation management program for performing an auction process for a predetermined resource for each predetermined interval to determine the amount of resources allocated to each of a plurality of clients, the resource-allocation management program causing a computer to execute a process comprising:

generating budget-allocation-plan information indicating how a budget used by each client for auction is allocated to each interval on the basis of demand-estimation information indicating an estimation value of the amount of resources each client needs for each interval and of budget-estimation information indicating an estimation value of a budget each client uses in an auction, the budget-allocation-plan information indicating the proportion of budget for each client that is expected to be used for an auction at each interval; and determining the upper limit of a budget each client uses in the auction on the basis of the budget-allocation-plan information.

2. The non-transitory computer readable storage medium according to claim 1, wherein the determining includes comparing a simulation result of an auction where the upper limit of budget each client uses in an auction is determined on the basis of a policy that is set by each client with a simulation result of the auction where the upper limit of budget each client uses in the auction is determined on the basis of the budget-allocation-plan information, and then determining that one of the upper limits is the upper limit of budget each client uses in the auction.

3. The non-transitory computer readable storage medium according to claim 1, wherein the determining includes presenting, as choices, the upper limit obtained on the basis of a policy set by each client and the upper limit obtained on the basis of the budget-allocation-plan information, and determining that the selected upper limit is the upper limit of budget each client uses in the auction.

4. The non-transitory computer readable storage medium according to claim 1, wherein the generating includes generating the budget-allocation-plan information in a manner so that each client obtains the maximum amount of resources with a minimum budget.

5. The non-transitory computer readable storage medium according to claim 1, wherein the process further comprises generating the budget-estimation information on the basis of the demand-estimation information.

6. A resource-allocation management apparatus comprising:

a memory; and a processor coupled to the memory, wherein the processor executes a process comprising:

generating budget-allocation-plan information indicating how a budget used by each client for auction is allocated to each interval on the basis of demand-estimation information indicating an estimation value of the amount of resources each client needs for each interval and of budget-estimation information indicating an estimation value of a budget each client uses in an auction, the budget-allocation-plan information indicating the proportion of budget for each client that is expected to be used for an auction at each interval; and determining the upper limit of a budget each client uses in the auction on the basis of the budget-allocation-plan information.

7. The resource-allocation management apparatus according to claim 6, wherein the determining compares a simulation result of an auction where the upper limit of budget each client uses in an auction is determined on the basis of a policy that is set by each client with a simulation result of the auction where the upper limit of budget each client uses in the auction is determined on the basis of the budget-allocation-plan information, and then determines that one of the upper limits is the upper limit of budget each client uses in the auction.

8. The resource-allocation management apparatus according to claim 6, wherein the determining presents, as choices, the upper limit obtained on the basis of a policy set by each client and the upper limit obtained on the basis of the budget-allocation-plan information, and determines that the selected upper limit is the upper limit of budget each client uses in the auction.

9. The resource-allocation management apparatus according to claim 6, wherein the generating generates the budget-allocation-plan information in a manner so that each client obtains the maximum amount of resources with a minimum budget.

10. The resource-allocation management apparatus according to claim 6, the processor further executes generating the budget-estimation information on the basis of the demand-estimation information.

11. A resource-allocation management method comprising:

generating, using a processor, budget-allocation-plan information indicating how a budget used by each client for auction is allocated to each interval on the basis of demand-estimation information indicating an estimation value of the amount of resources each client needs for each interval and of budget-estimation information indicating an estimation value of a budget each client uses in an auction, the budget-allocation-plan information indicating the proportion of budget for each client that is expected to be used for an auction at each interval; and determining, using a processor, the upper limit of a budget each client uses in the auction on the basis of the budget-allocation-plan information.

12. The resource-allocation management method according to claim 11, wherein the determining includes comparing a simulation result of an auction where the upper limit of budget each client uses in an auction is determined on the basis of a policy that is set by each client with a simulation result of the auction where the upper limit of budget each client uses in the auction is determined on the basis of the budget-allocation-plan information, and then determining that one of the upper limits is the upper limit of budget each client uses in the auction.

13. The resource-allocation management method according to claim 11, wherein
the determining includes presenting, as choices, the upper limit obtained on the basis of a policy set by each client and the upper limit obtained on the basis of the budget-allocation-plan information, and determining that the selected upper limit is the upper limit of budget each client uses in the auction.

14. The resource-allocation management method according to claim 11, wherein
the generating includes generating the budget-allocation-plan information in a manner so that each client obtains the maximum amount of resources with a minimum budget.

15. The resource-allocation management method according to claim 11, further comprising
generating, using a processor, the budget-estimation information on the basis of the demand-estimation information.

16. The non-transitory computer readable storage medium according to claim 1, wherein the budget-allocation-plan information is generated based further on a budget-consumption rate indicating proportion of budget each client has used for the auction in each interval.

17. The resource-allocation management apparatus according to claim 6, wherein the budget-allocation-plan information is generated based further on a budget-consumption rate indicating proportion of budget each client has used for the auction in each interval.

18. The resource-allocation management method according to claim 11, wherein the budget-allocation-plan information is generated based further on a budget-consumption rate indicating proportion of budget each client has used for the auction in each interval.

* * * * *